Eloranta et al.
[45] Mar. 19, 1974
3,798,665

[54] APPARATUS FOR ADAPTING A REFLEX CAMERA TO USE WITH A BINOCULAR MICROSCOPE

[75] Inventors: Vaito K. Eloranta, Needham; Vivian K. Walworth, Concord, both of Mass.

[73] Assignee: Polaroid Corporation, Cambridge, Mass.

[22] Filed: Apr. 25, 1972

[21] Appl. No.: 247,407

[52] U.S. Cl. .......................................... 95/12, 95/86
[51] Int. Cl. .............................................. G03b 29/00
[58] Field of Search .................................. 95/12, 86

[56] References Cited
UNITED STATES PATENTS

| | | | |
|---|---|---|---|
| 3,292,490 | 12/1966 | Moore | 95/12 |
| 2,922,609 | 1/1960 | Collier | 95/86 X |
| 1,049,182 | 12/1912 | Watkins | 95/12 |
| 2,933,992 | 4/1960 | Bushnell et al. | 95/86 X |
| 2,967,456 | 1/1961 | Maier | 95/12 |

*Primary Examiner*—Samuel S. Matthews
*Assistant Examiner*—E. M. Bero

[57] ABSTRACT

An apparatus for attaching an automatic reflex camera, with a photoelectric exposure control, to a binocular microscope is disclosed. The apparatus includes a tray with a clamp to hold it on one eyepiece of the binocular microscope and a slide clip to retain the camera in the tray. A tube, connected to the tray by a fiber optic light pipe, fits over the other eyepiece and monitors the available light for the photoelectric exposure control.

9 Claims, 1 Drawing Figure

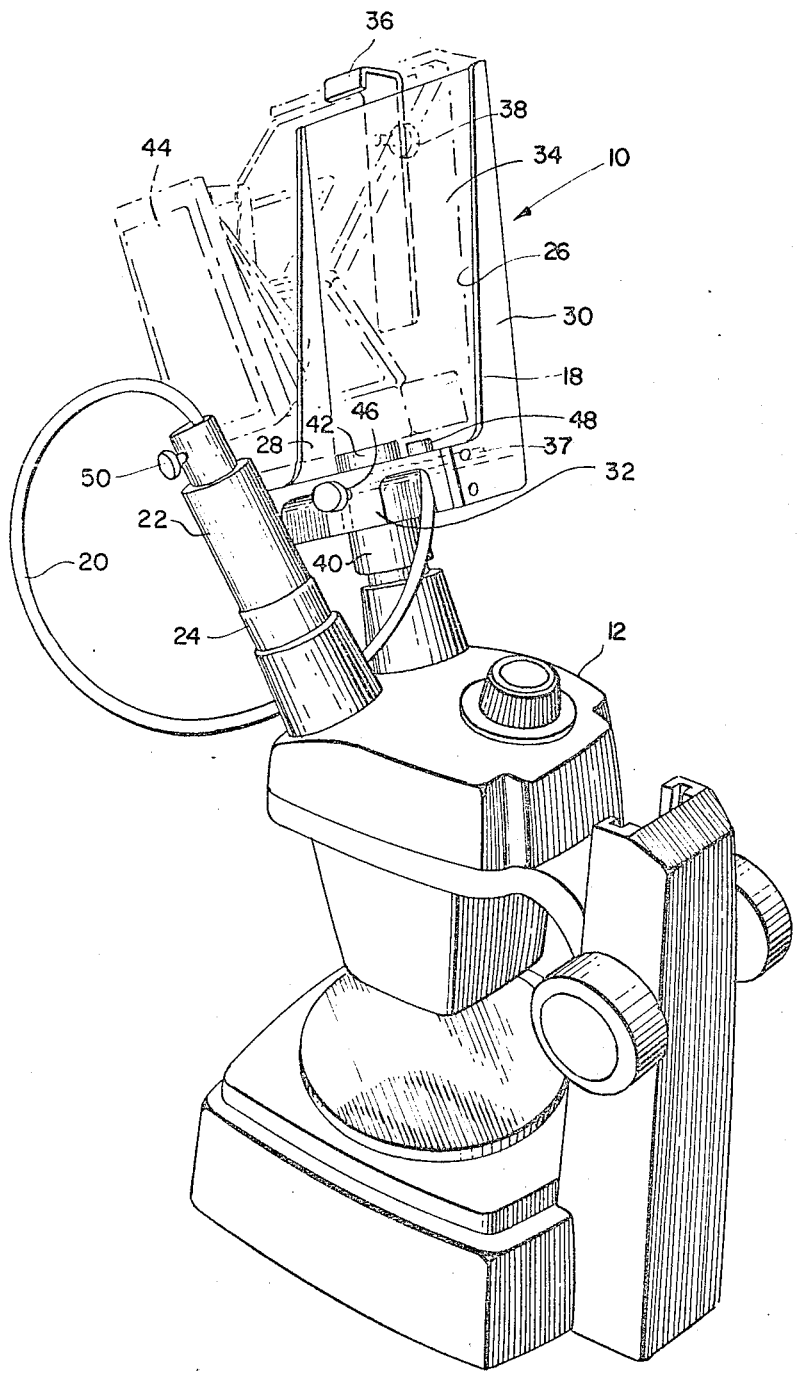

APPARATUS FOR ADAPTING A REFLEX CAMERA TO USE WITH A BINOCULAR MICROSCOPE

BACKGROUND OF THE INVENTION

The present invention pertains to photographic recording in microscopy. Photography is a convenient means for recording the appearance of microscopic specimens. However, in the past such photography generally required the use of special cameras and/or microscopes. Moreover, a certain degree of inconvenience was associated with the change-over from visual to photographic operation of a microscope.

SUMMARY OF THE INVENTION

The apparatus described herein is the preferred embodiment of an invention that adapts an automatic reflex camera for use with a binocular microscope. The reflex camera has means for automatically regulating the exposure in accordance with the available light and means for processing and ejecting finished photographic print.

The apparatus includes a tray that clamps to either of the eyepieces of a binocular microscope. The tray positions the camera over the eyepiece it is clamped to and also optically aligns the camera to the eyepiece. A sliding clip at the top of the tray retains the camera in the tray. To operate the automatic exposure control of the camera, a tube fitted over the other eyepiece directs light through a fiber optic light pipe connected between the tube and the lower end of the tray. A clamp on the tray positions the end of the light pipe in front of the photocell of the camera's exposure control. A slot at the bottom of the tray allows the camera to freely eject the exposed print after processing it.

The camera photographs the image an observer would see if he removed the camera and looked directly through the eyepiece. An advantage of this arrangement is that an observer can still use the microscope with the camera in place by means of the camera's reflex viewfinder.

An object of this invention is to provide an apparatus for adopting an automatic camera for taking pictures through a binocular microscope.

Another object of this invention is an apparatus to aid in photographing an image through one eyepiece of a binocular microscope and in determining the required exposure through the other eyepiece of the binocular microscope.

DESCRIPTION OF THE DRAWING

Other objects and many of the attendant advantages of the present invention will be better appreciated and said invention will be clearly understood by reference to the following detailed description when considered in conjunction with the accompanying drawing illustrating one embodiment of the instant invention, wherein:

FIG. 1 illustrates the apparatus supporting an automatic reflex camera on a binocular microscope.

DESCRIPTION OF THE PREFERRED EMBODIMENT

Reference should be had to FIG. 1. An adaptor 10 attaches to a binocular microscope 12 by sliding over an eyepiece 40. A fiber optic light pipe 20 extends from the adaptor 10 to a sleeve 22 over the other eyepiece 24. The light pipe 20 provides a means for operating an automatic exposure control built into a reflex camera 16. The reflex camera 16 slips, shutter housing 18 down, into the adaptor 10.

The adaptor 10 comprises a tray 26 with sides 28 and 30 attached to a clamping block 32. The base 34 of the reflex camera 16 nestles into the tray 26, between the sides 28 and 30, resting its forward edges on the clamping block 32. A clip 36 slides up permitting the base 34 to easily enter the tray 26, and then it slides down over the base 34 to retain the reflex camera 16 in the adaptor 10. A thumb screw 38 may be provided to clamp the clip 36 in place.

At the lower end of the tray 26, just above the clamping block 32, is a transverse slot 37. The slot 37 permits the microscopist to immediately receive a finished photographic print as the reflex camera 16 ejects the print from between a set of processing rollers (not shown) within the camera.

The clamping block 32 fits over the standard eyepiece 14. A thumb screw 46 clamps the adaptor 10 onto the eyepiece 14 over the binocular microscope 12. The adaptor 10 aligns the reflex camera 16 with the eyepiece 14 so the optic axis of the reflex camera 16's objective lens 42 is coaxial with the optic axes of the binocular microscope 12 emerging from its eyepiece 14. The light emanating from the eyepiece 14 reaches the objective lens 42 through a hole bored in the clamping block 32.

The binocular microscope 12 and the eyepiece 14 form a virtual image formed about 50 centimeters forward of the eyepiece 14. It is this virtual image that the reflex camera 16 "sees" and photographs. To observe the subject under the binocular microscope with the reflex camera 16 held in place by the adaptor 10, one can look through the viewfinder 44 of the camera 16.

A small thumb screw (not shown) clamps one edge of the fiber optic light pipe 20 in front of a photocell 48 that activates the automatic exposure control of the reflex camera 16. The other end of the light pipe 20 is held by a thumb screw 50 in the end of the sleeve 22 so it receives the light emanating from the eyepiece 24.

The light emanating from each eyepiece 14 and 24 of the binocular microscope 12 is equal. Clearly, the amount of light reaching the photocell 48 through the optical means for light piping indicates the amount of light reaching the objective lens 42 directly through the eyepiece 14. The reflex camera 16 has means for trimming the automatic exposure control, if required; and those skilled in the art know how to reduce the brightness of light reaching the photocell 48 if necessary.

It can be readily understood that many variations and modifications of the present invention are possible in light of the aforementioned teachings, and it will be apparent to those skilled in the art that various changes in form and arrangement of components may be made to suit requirements without departing from the spirit and scope of the invention. It is, therefore, to be understood that, within the scope of the appended claims, the instant invention may be practiced in a manner otherwise than specifically described herein.

What is claimed is:

1. An apparatus for attaching a camera to a binocular microscope, said camera having an automatic exposure control and a mechanism that ejects a photograph, comprising:

a tray adapted to hold said camera;

a clamp, at one end of said tray, for attaching said tray to an eyepiece of said binocular microscope so said camera is in optical alignment with said eyepiece;

a sliding clip, at the other end of said tray, that fits over the rear of said camera for retaining said camera in said tray;

a slot in said tray located to allow said mechanism to freely eject a photograph from said camera; and optical means for using light emanating from a second eyepiece on said microscope to activate said automatic exposure control.

2. The apparatus described in claim 1, wherein said optical means comprises:

a fiber optic light pipe;

a tube, adapted for fitting over said second eyepiece, having means for positioning one end of said light pipe in the exit pupil of said eyepiece; and holding means, proximate said clamp, for positioning the other end of said light pipe so light emanating from said light pipe will activate said automatic exposure control.

3. An apparatus for attaching a camera to a microscope so as to make photographs of objects magnified by said microscope, said camera having an exit through which a photograph can emerge, said apparatus comprising:

a tray adapted to hold said camera;

means, at one end of said tray, for attaching said tray to said microscope so said camera is in optical alignment with said microscope and can photograph an object magnified by said microscope; and means for releasably retaining said camera in said tray including a clip slidably attached to said tray, said clip shaped to fit over said camera in a first position so as to secure it in said tray and in a second position to permit said camera to be freely placed in or removed from said tray.

4. The apparatus described in claim 3, further comprising a slot through said tray located to allow said photograph to freely emerge from said exit and pass through said tray.

5. The apparatus described in claim 3, further comprising means for employing light passing through said microscope to activate an automatic exposure control in said camera.

6. The apparatus described in claim 5, wherein said means for employing light passing through said microscope to activate said automatic exposure control comprises:

a fiber optic light pipe;

a tube, adapted to fit over an eyepiece of said microscope, having means for positioning one end of said light pipe in the exit pupil of said eyepiece; and holding means for positioning the other end of said fiber optic light pipe so light emanating from said other end can activate said automatic exposure control.

7. The apparatus described in claim 3, wherein said means for attaching said tray to said microscope comprises a clamp adapted for grasping an eyepiece of said microscope.

8. An apparatus for attaching a camera to a microscope by its base so as to make photographs of objects magnified by said microscope, said apparatus comprising:

a tray of rectilinear configuration adapted to receive said base of said camera so as to support said camera;

clamping means, attached to the forward end of said tray, for attaching said tray to said microscope so said camera is in optical alignment with said microscope and can photograph an object magnified by said microscope, said clamping means defining a support surface against which the forward end of said camera rests when said camera is situate in said apparatus;

manually operable means for releasably retaining said base of said camera against said tray, including a clip that has a shape for engaging said base and said tray so as to hold said camera in said apparatus; and a pair of side walls on said tray, wherein said side walls laterally position said base within said tray.

9. An apparatus for attaching a camera to a microscope so as to make photographs of objects magnified by said microscope, said camera having an exit in its forward portion through which it can eject a photograph, said apparatus comprising:

a tray of rectilinear configuration adapted to receive said camera, said tray having a pair of side walls to position said camera within said tray;

clamping means, attached to the forward end of said tray, for attaching said tray to said microscope so said camera is in optical alignment with said microscope and can photograph an object magnified by said microscope, said clamping means defining a support surface against which the forward end of said camera can rest when said camera is situate in said apparatus;

a slot through said tray, proximate said support surface, through which a photograph emerging from said exit can pass through and out of said apparatus; and a clip that has a shape for engaging said camera and said tray so as to hold said camera in said apparatus.

* * * * *